(12) United States Patent
Meddaugh et al.

(10) Patent No.: US 7,222,355 B2
(45) Date of Patent: May 22, 2007

(54) MULTI-MODE VIDEO PROCESSOR

(75) Inventors: Samuel Alan Meddaugh, Eagan, MN (US); David Gordon Hanson, Spring Lake Park, MN (US); Gerald Brown, Savage, MN (US); Mark Allen Owen, Apple Valley, MN (US); Kenneth L Graber, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1217 days.

(21) Appl. No.: 09/738,099

(22) Filed: Dec. 15, 2000

(65) Prior Publication Data

US 2002/0112242 A1  Aug. 15, 2002

(51) Int. Cl.
*H04N 7/18* (2006.01)
*H04N 5/268* (2006.01)
*G06F 3/00* (2006.01)

(52) U.S. Cl. .......................... 725/82; 348/705; 348/706

(58) Field of Classification Search ................ 348/143, 348/159, 14.11–14.13; 715/753–759; 725/78
See application file for complete search history.

(56) References Cited

U.S. PATENT DOCUMENTS

| | | | | |
|---|---|---|---|---|
| 5,285,262 A | * | 2/1994 | Sims et al. ................. | 348/441 |
| 5,574,964 A | * | 11/1996 | Hamlin ....................... | 725/78 |
| 5,638,426 A | * | 6/1997 | Lewis ...................... | 379/90.01 |
| 5,751,707 A | * | 5/1998 | Voit et al. ................... | 370/384 |
| 5,808,659 A | * | 9/1998 | Coutinho et al. ............ | 725/141 |
| 5,844,609 A | * | 12/1998 | Filor et al. ............. | 375/240.01 |
| 6,097,429 A | * | 8/2000 | Seeley et al. ................ | 348/154 |
| 6,222,881 B1 | * | 4/2001 | Walker ................... | 375/240.03 |
| 6,791,620 B1 | * | 9/2004 | Elswick et al. ............. | 348/441 |

* cited by examiner

*Primary Examiner*—John Miller
*Assistant Examiner*—Dominic Saltarelli

(57) ABSTRACT

A circuit arrangement and method are disclosed for providing a video signal to a video display from a selectable subset of a plurality of digital video data carried on a plurality of video data channels. The digital video data is generated from video signals from a plurality of video sources, and each video channel selectably carries either color or monochrome video data. A processor is configured and arranged to interpret display commands, and a selector circuit is coupled to the processor. The selector circuit is arranged for connection to the plurality of video data channels and selects digital video data from a subset of the channels responsive to an input selection signal from the processor. A video data sequencer is coupled to the selector circuit and decodes color and monochrome video data from the video channels responsive to configuration signals indicating selected data formats for the channels and merges the selected video data into frames of video data. A digital-to-analog converter generates an analog video signal from the frames of video data.

14 Claims, 8 Drawing Sheets

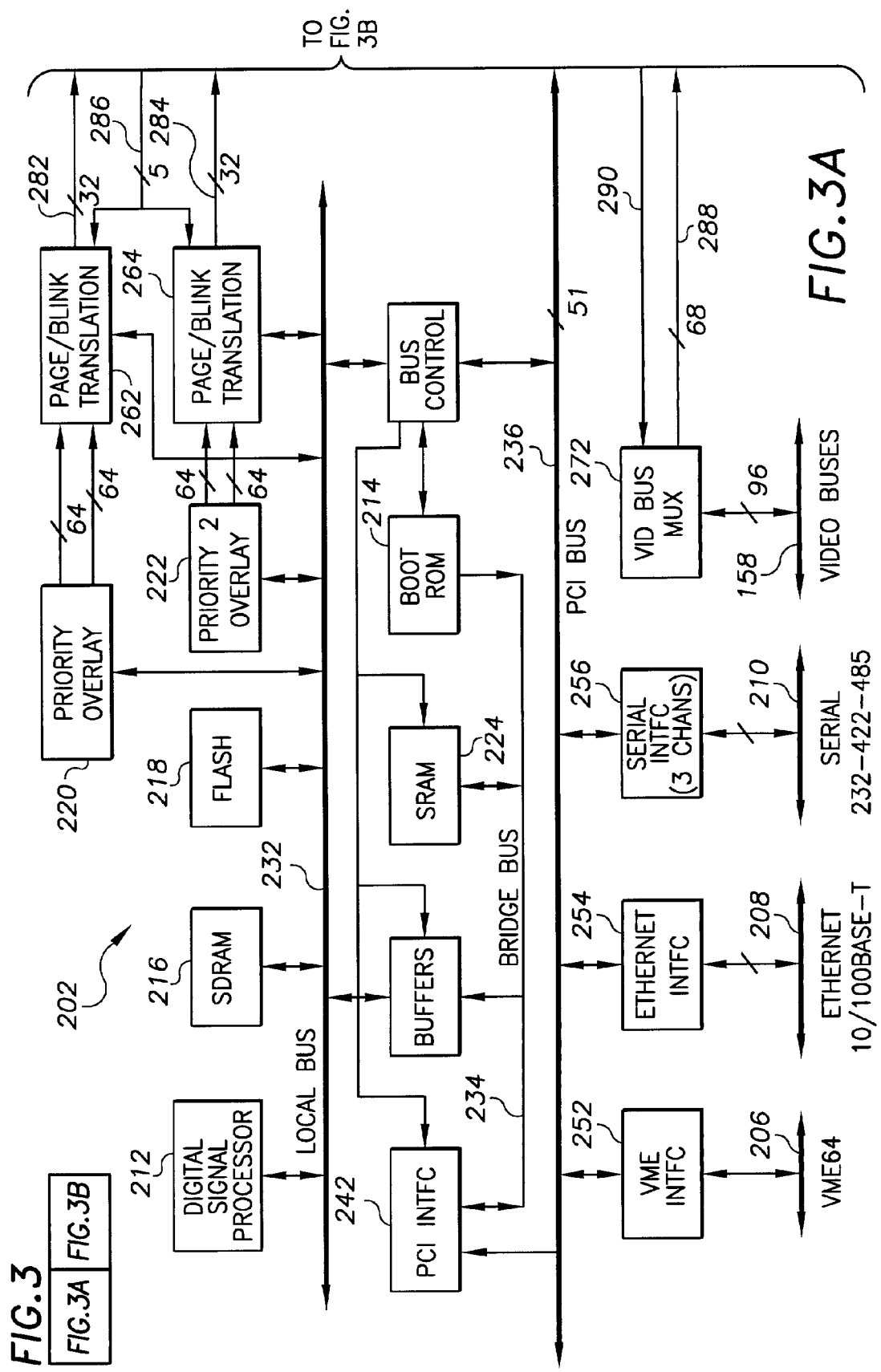

MULTI-MODE VIDEO PROCESSOR

RELATED PATENTS/APPLICATIONS

The present application is related to the patent having U.S. Pat. No. 7,058,967, entitled, "VIDEO DISTRIBUTION SYSTEM AND METHOD" by Graber et al., filed concurrent herewith on Dec. 15, 2000 and which is incorporated herein by reference.

FIELD OF THE INVENTION

The present invention generally relates to the distribution of video signals from multiple sources. More particularly, the invention relates to a video processor for processing and distributing video data from a plurality of video sources.

BACKGROUND

With the arrival of digital video technology and economical hardware, new applications are conceived and deployed with increasing regularity. Digitizing video signals enables remote and selective monitoring of one or more video signals, and economical hardware increases the range of problems for which the technology is suitable for applications.

Some digital video applications involve multiple personnel monitoring selected ones of a number of video signals. In these applications, the number of personnel is usually less than the number of video signals, processor-based control allows concurrent display of one or more video signals at a display terminal, and each person monitors and controls the display at one or more display terminals. For example, 4 people may be assigned the task of monitoring the video signals from a dozen or more sources, wherein each person can select for display at a display terminal one or more of the video signals. It will be appreciated that such systems have use in security, military, aviation, traffic, environmental and many other applications.

The particular requirements related to weight limits, modularity, and fail-safe operations present many challenges for designers of video distribution system. For example in a distributed architecture, workstations with powerful hardware and complex software may perform functions related to digitizing video signals and controlling the distribution and display of the video data. The distributed architecture may be excessive in terms of cabling if weight is a consideration and may be unduly complicated if modularity is a consideration.

Another challenge involves adapting custom designed video distribution systems and applications to use commercial off the shelf (COTS) parts versus custom designed parts. Many manufacturers prefer to manufacture high volume parts and charge a premium to provide the low volume, custom parts. To further complicate the situation for system designers, the pin resources COTS parts are also reduced at a time when system users are demanding that the video distribution system support more video channels.

A system and a method that addresses the aforementioned problems, as well as other related problems, are therefore desirable.

SUMMARY OF THE INVENTION

In various embodiments, the invention provides a video signal to a video display from a selectable subset of a plurality of digital video data carried on a plurality of video data channels. The digital video data is generated from video signals from a plurality of video sources, and each video channel selectably carries either color or monochrome video data. A processor is configured and arranged to interpret display commands, and a selector circuit is coupled to the processor. The selector circuit is arranged for connection to the plurality of video data channels and selects digital video data from a subset of the channels responsive to an input selection signal from the processor. A video data sequencer is coupled to the selector circuit and decodes color and monochrome video data from the video channels responsive to configuration signals indicating selected data formats for the channels and merges the selected video data into frames of video data. A digital-to-analog converter generates an analog video signal from the frames of video data.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
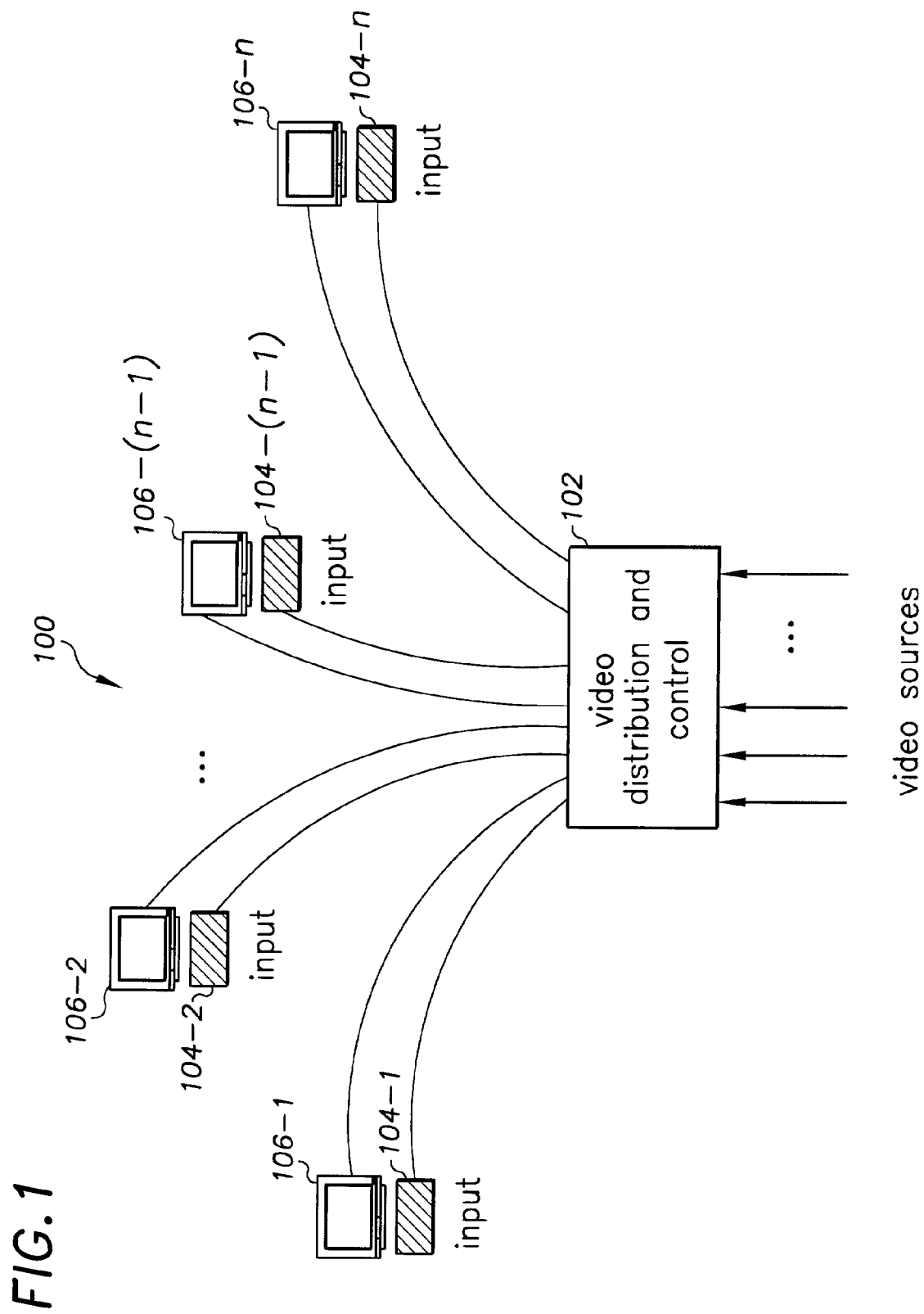
FIG. 1 is a block diagram of a video distribution system.

FIG. 1 is a block diagram of an example video distribution system in which the present invention is used. System 100 receives video signals from a plurality and variety of sources. Various combinations of one or more of the video signals are then selectively routed and displayed at display terminals. System 100 includes centralized video distribution and control arrangement 102 and a plurality of terminals. Each of the terminals includes an input device (104-1–104-n) and a video display terminal (106-1–106-n), each of which is driven by a separate video signal from video distribution and control arrangement 102.

Video distribution and control arrangement 102 receives video signals from a plurality of sources, which may include video cameras that generate NTSC signals, digital video cameras that generate digital video data, or radar systems, for example. The analog video signals are digitized within distribution and control arrangement 102 for the purpose of selecting video stream(s) and combining selected video data with graphical overlay data in response to signals from one of input devices 104-1–104-n. Digital video data that is input to the distribution and control arrangement is also selectable by the terminals. Operationally, for example, there may be 10 video sources, and 4 of the video sources may be selected for display at a particular one of the display terminals 106-1–106-n. The selection of the video sources is made in response to control signals received from the input device that is associated with the particular display terminal. Video distribution and control arrangement 102 converts the selected and combined digital video data to an analog video signal (e.g., RGB) to drive a video display.

The selection of video streams for display at a display terminal is user-controlled via an associated input device. An input device may take various forms, depending on application requirements. For example, input device may be a keyboard, a mouse, trackball, voice control or other known apparatus. Alternatively, the input device could be a separate touch screen or integrated with the display terminal in the form of a touch screen. In addition, numerous software control methodologies (commands, menus, and GUIs) could be employed in supporting the selection.

The overlay of graphical data onto video data is also performed in response to user controls initiated at an input device. For example, textual data can be overlaid on video data from a radar source for coordinate and directional information.

Although display terminals 106-1–106-n are all illustrated as being of the same type, it will be appreciated that different combinations of types of video display terminals could be used. For example, various combinations of monochrome and color display terminals, as well as various gradations thereof, could be used. Thus, the respective digital-to-analog converters of video distribution and control arrangement 102 must be compatible with the type of display terminal.

Figure 2:
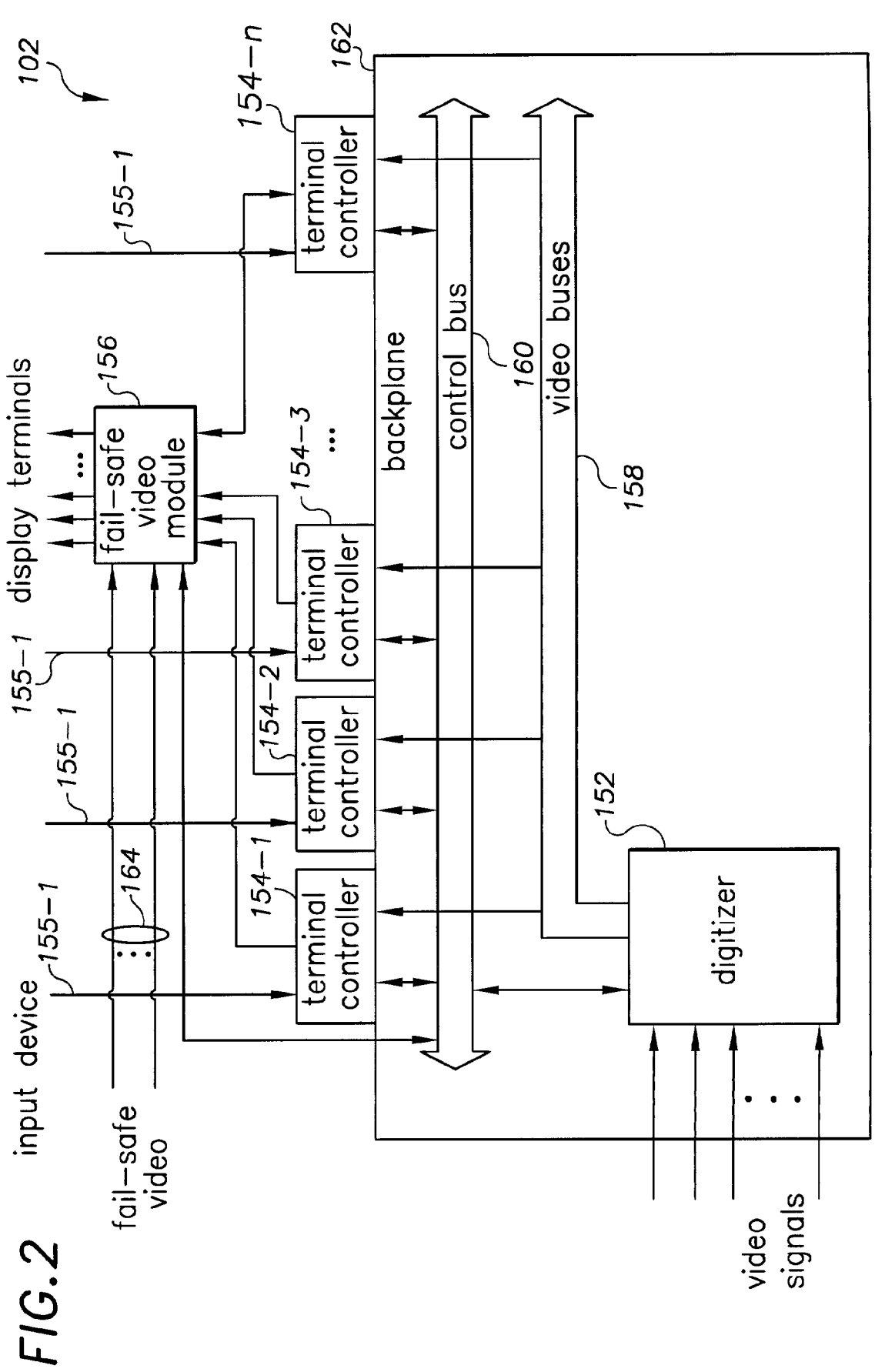
FIG. 2 is a block diagram of a video distribution and control arrangement in accordance with one embodiment of the invention.

FIG. 2 is a block diagram of a video distribution and control arrangement in accordance with one embodiment of the invention. Video distribution and control arrangement 102 receives a plurality of analog video signals, digitizes the signals into digital video streams, and selects subsets of the video streams for display on the connected video displays. In addition, graphical data generated in response to control signals from the input device are overlaid on the video data.

Video distribution and control arrangement 102 includes digitizer 152, multiple terminal controllers 154-1, 154-2, 154-3, . . . 154-n, and fail-safe video module 156. Digitizer 152 includes multiple analog-to-digital converters that generate digital video data from the input video signals and drives the video data on digital video bus 158. In another embodiment (not shown), digital video signals are also input to system 102 for distribution. The video data that is generated from a particular video signal is referenced herein as a "video stream". Each terminal controller 154-1-n performs the function of selecting one or more video streams for display on a connected display terminal in response to signals from a connected input device. For example, control signals are received by terminal controllers 154-1–154-n on lines 155-1–155-n. In addition, the terminal controller overlays graphics data on the video data in accordance with input signals and software executing within the controller.

Video bus 158 is comprised of a plurality of individual video buses (not shown), each dedicated to one of the video streams. Thereby, each of the terminal controllers 154-1–154-n has access to all of the video streams. In one embodiment, the individual buses include either 8 data lines and two clock lines (10-line buses) or 8 data lines and a single clock line (9-line buses). The 10-line buses may be used to carry either one color or two monochrome video streams. The data from the various sources is multiplexed on the buses to reduce the number of lines.

In an example embodiment, control bus 160 is implemented as a standard VersaModule Eurocard bus (VME bus). Control bus 160 is used to set various control registers in the modules that are connected to the bus. For example, digitizer 152 has control registers that dictate which video streams are carried on which of the video buses 158, terminal controllers 154-1-n have control registers that control which video buses are routed to display presentation processing elements (within the terminal controller) and thereafter to up to four independent display terminals, and fail-safe video module 156 has control registers that are used for selecting between fail-safe video signals and the other video signals. It will be appreciated that system-level control can be accomplished with an additional processor (not shown) that is coupled to control bus 160 for configuring the control registers of digitizer 152, terminal controllers 154-1–154-n, and fail-safe video module 156.

Video bus 158 and control bus 160 are integrated with backplane arrangement 162, which includes card slots (not shown) into which terminal controllers 154-1–154-n can be inserted. Thus, a modular system is provided in which additional display terminals 106 and accompanying input devices 104 can be added to the system with "plugable" terminal controllers and appropriate cabling. The backplane is comprised of a printed circuit board having signal lines for the control bus and video bus, components mounted on the circuit board to implement digitizer 152, and card slots for connecting terminal controllers. The card slots conform to ANSI/VITA standard 1-1994 (American National Standard for VME64), for example.

Terminal controller 154 performs the functions of selecting video streams from video bus 158 in response to user-control signals from an input device and converting the video streams from digital signals to analog signals. In addition, graphics data is overlaid on the video streams in accordance with application processing requirements. The terminal controller was not developed under government contract and is the subject of the separately filed patent application identified above.

Fail-safe video module 156 is provided to supply video signals from fail-safe sources, even if digitizer 152 or the sources supplying video signals thereto fail. For example in a security application, battery powered video cameras could be employed for scenarios where power is lost to other video sources. The particular characteristics of the fail-safe video sources are determined by the application. Module 156 provides video signals to the system display terminals 106-1–106-n, wherein the particular video signals that are output are either the video signals on lines 164 from the fail-safe video sources or the video signals from the terminal controllers 154-1–154-n. A set of relays is used to provide a specific video signal path even when the module is not energized (in the absence of power). In one embodiment, fail-safe video module 156 drives a plurality of RGB video outputs and also has a plurality of RGB inputs. Each of the video outputs has a fail-through capability, wherein video signals pass through the relays when the relays are in a de-energized state.

Figure 3B:
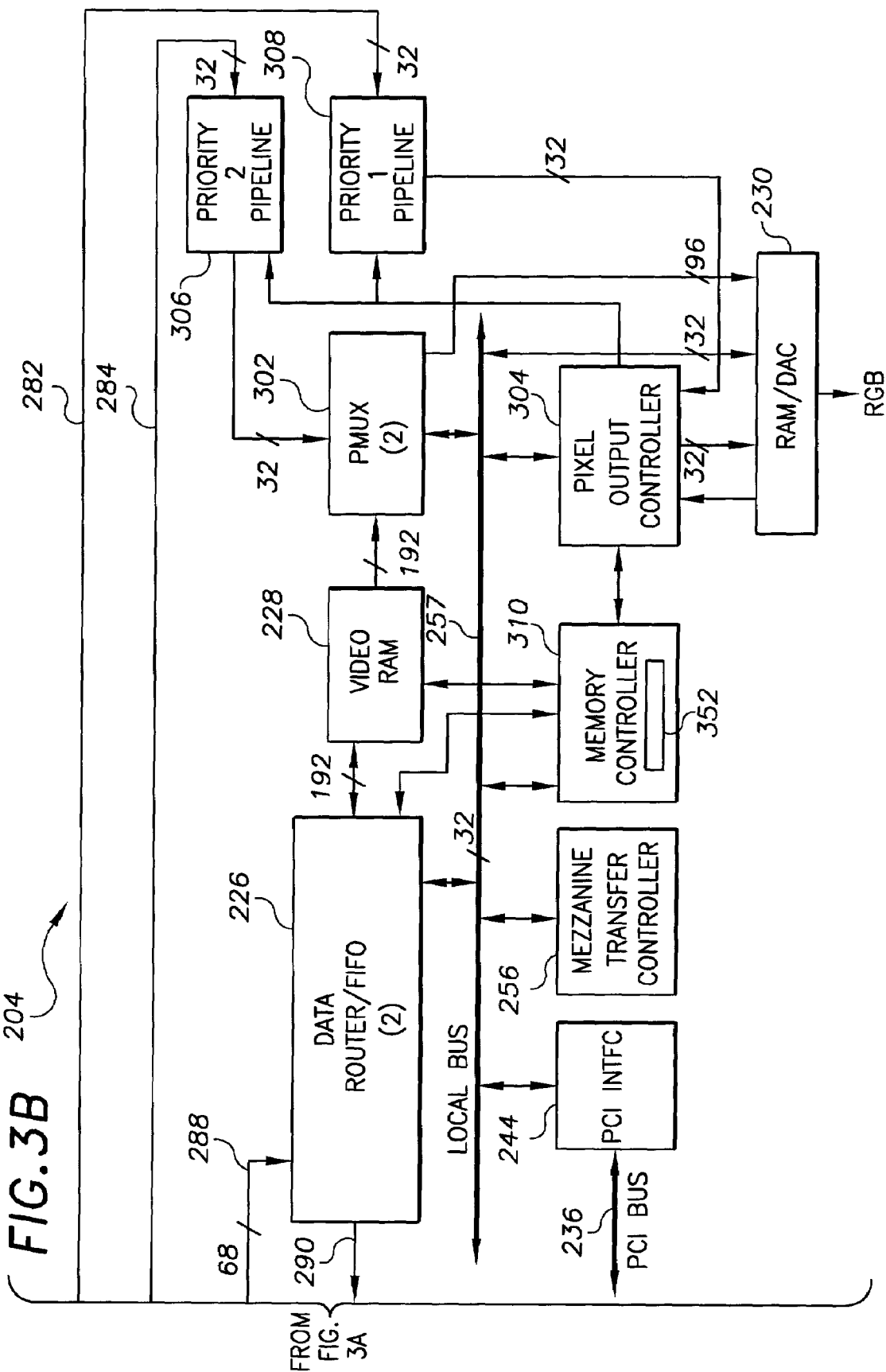
FIG. 3 shows the relationship between FIGS. 3A and 3B, which together illustrate a terminal controller in accordance with one embodiment of the invention.

FIG. 3 shows the relationship between FIGS. 3A and 3B, which together illustrate a terminal controller in accordance with one embodiment of the invention. In general, FIG. 3A shows a processor-based controller that selects video data for display, and FIG. 3B shows formatting logic that formats the selected video data and circuitry that converts the video data to an analog video signal. In one embodiment, the application control is hosted on a base printed circuit board (base board 202), and the formatting logic converter circuit is hosted on a mezzanine daughter board (mezzanine board 204) that is attachable to the base board. It will be appreciated that the all of the circuitry of the terminal controller could be hosted by a single printed circuit board in another embodiment.

A function of the terminal controller is to accept graphics commands and primitive instruction lists from a host processor and convert these commands into bit images for display. Control commands are received via VME64 bus 206, Ethernet bus 208, or serial bus 210, for example.

Base board 202 includes digital signal processor 212, non-volatile memory 214 for program storage, and volatile memories 216, 218, 220, 222, and 224 for storage of display lists, temporary program data storage, and host communication data. Mezzanine board 204 includes multiple data routers and associated FIFO buffers (collectively, block 226) and video memory 228 for receiving video data and storing processed video data for selected video channels. The video data are combined into a format compatible with the circuitry that performs the digital-to-analog conversion. Block 230 represents a RAM component and the circuitry that performs the digital-to-analog conversion. A three-tiered bus structure is used for communications between the major functional components. The busses include local bus 232, bridge bus 234, and bridge bus 236. Local bus 232 and PCI bus 236 provide communications between units on both the base board and on the mezzanine board.

Local bus 232 is a 64-bit data bus that is driven primarily by processor 212 and supports a transfer rate of up to 400 Mbytes/second. Thus, in the example embodiment, local bus 232 supports data transfer types typically associated with the TMS320C80 digital signal processor.

Bridge bus 234 is a non-multiplexed 32-bit address and data bus that provides a bidirectional interface between local bus 232 and PCI bus 236. The SRAM 224 and boot ROM 214 are connected to bridge bus 234, and access thereto by processor 212 is provided via PCI interface 242. Bridge bus 234 is used as an extension to local bus 232 with the additional capability of isolation from the local bus in the event access to a resource of the bridge bus is requested by a PCI bus master. Thus, a PCI bus master may utilize resources of bridge bus 234 without impacting normal operations on local bus 232.

PCI bus 236 conforms to PCI standards, and PCI interface 242 on the base board and PCI interface 244 are implemented with PCI I/O Accelerator interfaces from PLX Technology, Inc. Bus arbitration is accomplished using round-robin priority, and bus parking is implemented with an inactive bus being granted to the last user of the PCI bus. Those skilled in the art will recognize that appropriate address translation is implemented between buses 232, 234, and 236.

Processor 212 is the central control and processing element of the terminal controller. Generally, commands received via VME bus 206, Ethernet 208, or serial bus 210 are processed by processor 212, which also directs communications within the terminal controller. In one embodiment, processor 212 is a TMS320C80 digital signal processor from Texas Instruments, for example. Processor 212 is comprised of a RISC master processor and four parallel processing digital signal processors that are controlled by the master processor. The four parallel processors provide mathematical support and pixel manipulation for graphics data to be merged with the selected video data.

Boot ROM 214 is a high speed EPROM in the example embodiment and is used to ensure that the terminal controller maintains a minimum level of functionality, even if flash memory 218 is corrupted. The instructions stored in boot ROM 214 configures the devices connected to PCI bus 236 so that access to the resources can be accomplished via VME bus 206. The instructions also check whether the program in flash memory 218 is valid. If the program is valid, control is passed to the flash memory program. Otherwise, program execution remains in the boot ROM. Since VME bus interface 252 is configured to allow access to resources of local bus 232 via PCI bus 236, flash memory 218 can be reprogrammed via VME bus 206.

Flash memory 218 stores the primary operational software for processor 212, along with configuration bitstreams for configuring the field programmable gate arrays (FPGAs) that implement other units in the terminal controller. All PCI bus 236 masters have read and write access to the flash memory. However, a software-write-protect mode is available to prevent inadvertent write operations. In addition, a required programming-enable signal is connected to a hardware switch (not shown) so that all programming operations can be hardware disabled. In the example embodiment, flash memory 218 provides 16 Mbytes of storage, which is organized in sections of 2 Mbytes of 64-bit words.

SDRAM 216 is primarily used by software executing on processor 212 for temporary storage of data. In the example embodiment, SDRAM 216 includes 32 Mbytes, organized in portions of 4 Mbytes of 64-bit words. All PCI bus 236 masters have access to SDRAM 216.

SRAM 224 is used primarily to buffer data, whereby access thereto by a PCI bus 236 master will not impact operations of processor 212. For example, masters on VME bus 206, and Ethernet interface 254, and serial interface 256 use SRAM 224 for temporary storage of data. The SRAM includes 512 K 32-bit words in the example embodiment.

Video RAM on the base board is used for storage of graphics data to overlay on the video data and is organized as priority-1 overlay VRAM 220 and priority-2 overlay VRAM 222. Priority-1 overlay data is stored in VRAM 220, and priority-2 overlay data is stored in VRAM 222. The overlay data is graphics data that is overlaid on the video streams. For example, the graphics data may include a cursor and lines and shapes used to highlight information in the video streams. Priority-1 data preempts priority-2 data, which preempts the video stream data. Processor 212 and other PCI bus masters generate the priority-1 and priority-2 data according to the application requirements.

Each of VRAM 220 and VRAM 222 include 2 pages ("page 0" and "page 1") of RAM, wherein each page is organized as 64K 64-bit words which is sufficient to provide data for a 1280×1024 pixel (8-bit pixels) video display screen. The two pages are used to allow new graphics data to be written to one page of the VRAM while previous graphics data is output on an output port. When output of the data from one page is complete (timed in accordance with the system frame rate), that page becomes the page to which new graphics data is written, and the other page becomes the source for the output of graphics data. In one embodiment, the OKI MSM5416273 video DRAMs are used to implement VRAMs 220 and 222.

VRAMs 220 and 220 include a sequential access memory portion, which provides serialized data for output, and a non-sequential access portion. The data transfer operations supported by VRAMs 220 and 222 enable the transfer of data between the non-sequential access portion and the sequential access portion. A block-write operation is provided that supports a single-access write operation to 8 sequential pixel locations, and a flash-write operation is provided that supports a single access write operation to a complete line of memory (e.g., 4096 pixel locations).

Packed and unpacked pixel organizations are supported by VRAMs 220 and 222.

The sequential access ports (not shown) of VRAMs 220 and 222 are controlled by both of processor 212 and by mezzanine transfer controller 256. Processor 212 accesses the sequential access ports to transfer data from non-sequential RAM to sequential access RAM, and pixel data is shifted out of VRAMs 220 and 222 8-bits at a time, in parallel, under control of controller 256. A total of 32 pixels are available from the sequential accesses to VRAM 220 and VRAM 222 (16 pixels from VRAM 220 and 16 pixels from VRAM 222). Two 64-bit lines carry output data from each of VRAM 220 and VRAM 222, a first line for page 0 data and a second line for page 1 data. Pixel data output from the VRAMs are input to respective page control/blink translation units 262 and 264, which further manipulate the pixel data prior to being merged with the selected video data.

The page control function is used to select between the data of pages 0 and 1 of the input priority overlay data. For example, page control unit 262 receives 8 pixels from page 0 and 8 pixels from page 1 of priority-1 overlay VRAM 220. In response to control signals from processor 212, data from the desired page is selected. Thus, the 8 pixels from page 0 are selected in one cycle and output at twice the input rate (since the output port is 32 bits wide). In the next cycle, data from page 1 are selected.

The blink function is used for selectively alternating between pixel values output from overlay VRAMs 220 and 222 and pixel values programmed in the translation units 262 and 264. This alternation causes the selected graphics data to flash on the video display terminal. The blink function is activated with control signals from the processor 212, and each of translation units 262 and 264 is controlled independent of the other. Each of translation units 262 and 264 includes a look-up table (not shown) that is indexed by the selected pixel value. When the blink function is activated, the pixel that is output alternates between the input pixel value and the pixel value from the look-up table. Note that the selection between overlay data and video stream data is made by PMUX 302 in FIG. 3B. By including the blink function in the translation path, selected graphics data can be flashed on the video display without requiring periodic update of the VRAMS 220 and 222. This saves computation resources of processor 212.

Each of page control/blink translation units 262 and 264 includes a set of control registers, multiplexers and a lookup table (not shown). A 4:1 multiplexer performs the page control function, and the combination of a look-up table and 2:1 multiplexer performs the blink function. In one embodiment, units 262 and 264 are implemented on FPGAs.

VME bus interface 252 is generally compliant with the VME64 specification VITA 1-1994 and is operational as either a bus master or a bus slave. Ethernet and Serial II interfaces 254 and 256 are implemented with conventional components and/or logic cores.

VID bus multiplexer 272 selects a subset of input streams of video data and routes the selected video data to router/FIFO unit 226 to be merged with the overlay and graphics data. In one embodiment, VID bus multiplexer 272 has 4 data output ports and data input ports, each input port coupled to one of 10 video buses. Six of the 10 video buses 158 are 10-bit buses and are used as either a single YCrCb channel or as two monochrome channels. The other 4 video buses are 9-bit buses that are used as either a single YCrCb channel or as a single monochrome channel.

FIG. 3B is a functional block diagram of the logic implemented on mezzanine board 204. Generally, mezzanine logic combines the selected video data with graphics and overlay data, and then converts the video data to a video signal (e.g., RGB). The data router section of unit 226 formats the margins and sizes of the images and loads the data into FIFO devices. When full, the FIFO devices burst the data into video RAM 228, which provides a steady, synchronous flow of image data through priority and decode logic within pixel multiplexer 302 and through pixel output controller 304. The pixel data is then routed to RAM/DAC unit 230, which performs a digital-to-analog conversion (DAC) of the pixel data. Register pipelines depicted as blocks 306 and 308 buffer the data output from page control/blink translation unit 264 and page control/blink translation unit 262, respectively. Memory controller 310 arbitrates and controls access to video RAM 228 by FIFOs 226 and pixel multiplexer 302.

Mezzanine transfer controller 256 handles PCI bus 236 for the units coupled to the local bus 257. Controller 256 also provides an interface for configuring FPGAs that are used to implement the functional units of the mezzanine board. In one embodiment, controller 256 is implemented with a complex programmable logic device (CPLD)

Block 226 includes a data router and a FIFO for each of the selected streams of video data. Each data router converts video data from YCrCb format to RGB format using conventional techniques. Thereafter, the data router makes any selected adjustments to the margins (whereby the image is cropped), and the remaining video data is compressed at a selectable compression ratio. The data routers are configurable to support a standard frequency data rate for monochrome and color video data as well as a high frequency video data for both monochrome and color data. The data FIFOs of block 226 buffer data transfers between the data routers and video RAM 228, transfers from the video RAM to digital signal processor 212, and transfers from the digital signal processor to the video RAM.

Video RAM 228 stores the combined video data from the selected video streams prior to input to DAC 230. The addresses at which the video data are stored in video RAM 228 is controlled by memory controller 310, and the positions at which the pixel data are displayed on a display terminal are controlled by pixel output controller 304. In the example embodiment, video RAM 228 is a dual ported memory and provides storage for a display terminal of 1280 pixels×1024 lines×24 bits/pixel (8 bits for red, 8 bits for green, and 8 bits for blue). The first port is 192 bits wide (8 pixels×24 bits/pixel) in the example embodiment for burst reading and burst writing by the data routers. The second port is also 192 bits and supports serial access mode transfers from video RAM 228 to pixel multiplexer 302 as controlled by memory controller 310.

Pixel multiplexer 302 receives pixels of video data from video RAM 228 and pixels of priority-2 overlay data from pipeline 306. If a priority-2 overlay pixel is non-blank (non-blank being some predetermined value), the priority-2 overlay pixel is selected over the video pixel. The video pixel is selected if the priority-2 overlay pixel is blank. Priority-1 overlay data is routed from priority-1 pipeline 308 to pixel output controller 304, where the priority-1 overlay data is delayed for synchronization with the video data/priority-2 overlay data. RAM/DAC 230 selects priority-1 overlay data over the data output from pixel multiplexer 302 if the priority-1 data is non-zero.

Pixel output controller 304 provides timing signals to graphics pipeline register 306 and to overlay pipeline register 308, initiates sequential access mode requests to video RAM 228, performs address calculations to reference data in the video RAM for windows at a display terminal, and provides overlay blink data to the RAM/DAC unit 230.

In another embodiment of the invention, memory controller 310 includes a user-programmable priority register 352. Priority register 352 is programmable via local bus 257, and the bits in the priority register are used by memory controller 10 is selecting which pixels are written into video RAM 228 where the selected video streams would overlap on the display 106-i. Each of the four possible video streams has associated therewith two bits in the priority register. The two-bit value associated with a video stream designates its priority relative to the other video streams.

Figure 4:
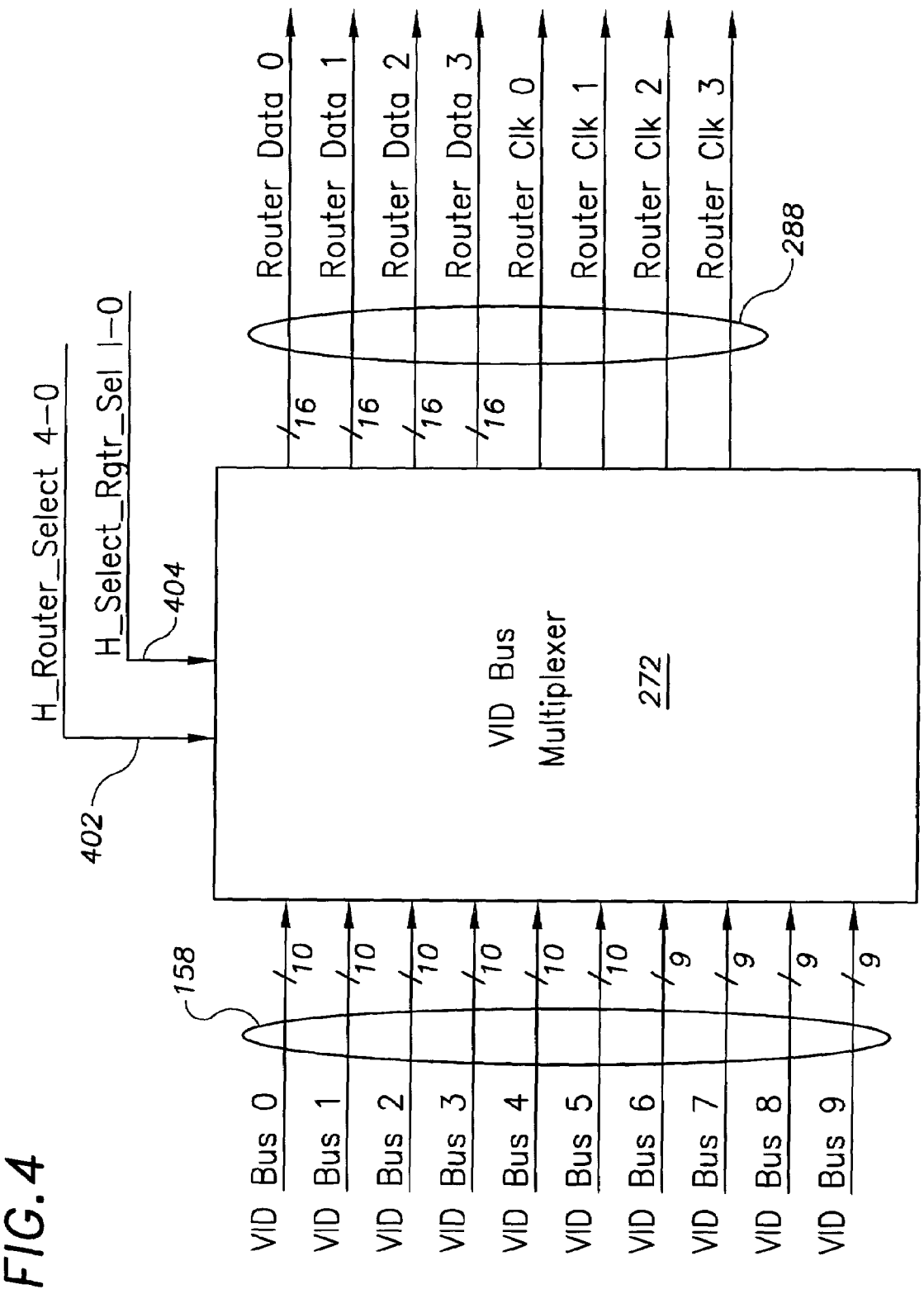
FIG. 4 is a functional block diagram of a video bus multiplexer.

FIG. 4 is a functional block diagram of video bus multiplexer 272 in accordance with an example embodiment of the invention. VID bus multiplexer 272 selects a subset of input streams of video data and routes the selected video data to router/FIFO unit 226 to be merged with the overlay and graphics data. Each of VID buses 0–5 is configurable as either a single YCrCb color channel or as two monochrome channels, and VID buses 6–9 are configurable as either a single color or single monochrome channel. Data is received at a clock rate of up to 33 MHz with two data words transmitted during a single clock cycle (the first word on the rising clock edge and the second word on the falling clock edge). Data is latched and demultiplexed so that is it provided on router data lines 0–3 at ½ the incoming rate (where first and second data words are available at rising clock edges). The four selected video streams from VID buses 0–9 are routable to any of router data lines 0–3.

The selection of video streams from VID buses 0–9 is made with signals shown as being input on line 402. The selection of the output ports to which the selected video streams are routed is made by signals shown as being input on line 404. VID buses 0–5 are 10-signal interfaces in the example embodiment, and VID buses 6–9 are comprised of signal lines: 8 data lines and 1 clock line.

The formatting and clocking of the video data described below is a byproduct of using commercial off-the-shelf (COTS) parts in adaptations for legacy systems. For example, prior video distribution systems had on the order of 300 pins available for distribution of video signals. Since an RGB video signal requires 7 bits per color plus control bits, 24 bits per channel are typically required. If the user requires 6 channels, the number of pins requires increases to 144 (6 channels*24 bits). However, where cost constraints dictate the usage of generally available VME bus connectors having fewer than 100 pins and the demand for video channels is increasing, the challenge faced is that of having too few pin resources to meet the output demanded of the video distribution system. To solve this problem, the analog signals are digitized in YCrCb format and the video data multiplexed over the available channels. The data are then converted back to RGB format to interface with legacy components.

Circuitry within digitizer 152 transmits two data words during a single clock cycle (the first word on the rising clock edge and the second word on the falling clock edge). Using double edge clocking effectively reduces the number of signals lines from the digitizer to arrangement 202, thereby avoiding frequency mismatch problems or glitching that may occur on backplane 162 (FIG. 2) due to the use of off the shelf components. It will also be appreciated that if the data were clocked only on the rising edge, an additional data line would be required to identify which of the two data words is being transmitted at any given time. Clocking on the rising and falling edges supports data identification by the polarity of the clock edge. VID bus mux 272 latches and demultiplexes the data so that is it provided to data router 226 (FIG. 3B) at ½ the incoming rate (where first and second data words are available at rising clock edges).

Six of the VID buses 158 consist of a 10-signal interface in the example embodiment. The upper half of the 10-signal interface includes 4 data lines and an associated clock line, and the lower half is similarly arranged. The number of input pins is reduced by time multiplexing pixel data on each half of the bus using the rising and falling edges of the clock signal. Four bits comprising half of word 0 are transferred on the rising edge of the clock, and four bits comprising half of word 1 are transferred on the falling edge of the clock. Thus, each complete clock cycle produces 8 bits of data from each half of a VID bus. Separating the upper and lower halves of a transfer allows two different monochrome video streams to be transferred over a single VID bus. When both halves are used together, a single color video stream can be transferred on a VID bus.

Four of the VID buses are comprised of 9 signal lines: 8 data lines and 1 clock line. Thus, as compared to the 10-wide VID buses the 9-wide VID buses have a single clock signal controlling both the upper and lower halves of the 8 data lines. The tables below illustrate the various data formats. Table 1 is the data format for a 10-wide VID bus configured for dual monochrome video streams; Table 2 is the data format for a 10-wide VID bus configured for a single color video stream; and Table 3 is the data format for a 9-wide VID bus configured for a single color or monochrome video stream. Note that Tables 1 and 2 include two clock signals (C(U) and C(L)), while Table 3 includes only a single clock signal. Y0–7 are the bits that represent the intensity level of a pixel, and CrCb0–7 represent the chroma level of a pixel.

When configured as a color bus, the upper and lower halves of a VID bus transfer bits of video data during each clock period (8 bits on the rising edge and 8 bits on the falling edge). Eight of the bits represent the intensity data for a pixel (Y0–7), and the other eight bits represent half of the pixel color data. The color data alternates on successive transfers between Cr and Cb. Thus, in transferring 32 bits of video data, two pixel intensity values are transferred, but only one complete set of color values are transferred (8 bits of Cr and 8 bits of Cb). Thus, two successive pixels have identical color data, but unique intensity data. Certain Y in combination with CrCb values are used for frame control information. For example, predetermined Y values can be used to indicate an invalid pixel, the beginning of a pixel line, the end of a pixel line, horizontal and vertical resets of blank and active lines etc.

TABLE 1

(dual monochrome)

| | Video stream A | | | | | Video stream B | | | |
|---|---|---|---|---|---|---|---|---|---|
| line | C(U) | 7 | 6 | 5 | 4 | C(L) | 3 | 2 | 1 | 0 |
| word 0 | rising | Y3 | Y2 | Y1 | Y0 | rising | Y3 | Y2 | Y1 | Y0 |
| word 1 | falling | Y7 | Y6 | Y5 | Y4 | falling | Y7 | Y6 | Y5 | Y4 |

TABLE 2

(single color)

| | | Video stream A | | | | | Video stream B | | | |
|---|---|---|---|---|---|---|---|---|---|---|
| line | C(U) | 7 | 6 | 5 | 4 | C(L) | 3 | 2 | 1 | 0 |
| word 0 | rising | CrCb3 | CrCb2 | CrCb1 | CrCb0 | rising | Y3 | Y2 | Y1 | Y0 |
| word 1 | falling | CrCb7 | CrCb6 | CrCb5 | CrCb4 | falling | Y7 | Y6 | Y5 | Y4 |

TABLE 3

(single color/single monochrome)

| | | Video stream A | | | | Video stream B | | | |
|---|---|---|---|---|---|---|---|---|---|
| line | C(U) | 7 | 6 | 5 | 4 | 3 | 2 | 1 | 0 |
| word 0 | rising | CrCb3 | CrCb2 | CrCb1 | CrCb0 | Y3 | Y2 | Y1 | Y0 |
| word 1 | falling | CrCb7 | CrCb6 | CrCb5 | CrCb4 | Y7 | Y6 | Y5 | Y4 |

Line 288 represents data and clock signal lines that are routed to respective ones of data routers 226 (FIG. 3B). In the example embodiment there are four data routers 0–3. Thus, router data 0 is transmitted to data router 0, router data 1 is provided to data router 1, etc. Similarly, the clock signals router Clk 0 is provided to data router 0, router Clk 1 is provided to data router 1, etc. Each router data line is 16 bits wide in the example embodiment. Table 4 below illustrates color and monochrome data formats.

TABLE 4

| bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| color | CrCb7 | CrCb6 | CrCb5 | CrCb4 | CrCb3 | CrCb2 | CrCb1 | CrCb0 | Y7 | Y6 | Y5 | Y4 | Y3 | Y2 | Y1 | Y0 |
| mono | Y7 | Y6 | Y5 | Y4 | Y3 | Y2 | Y1 | Y0 | Y7 | Y6 | Y5 | Y4 | Y3 | Y2 | Y1 | Y0 |

Figure 5:
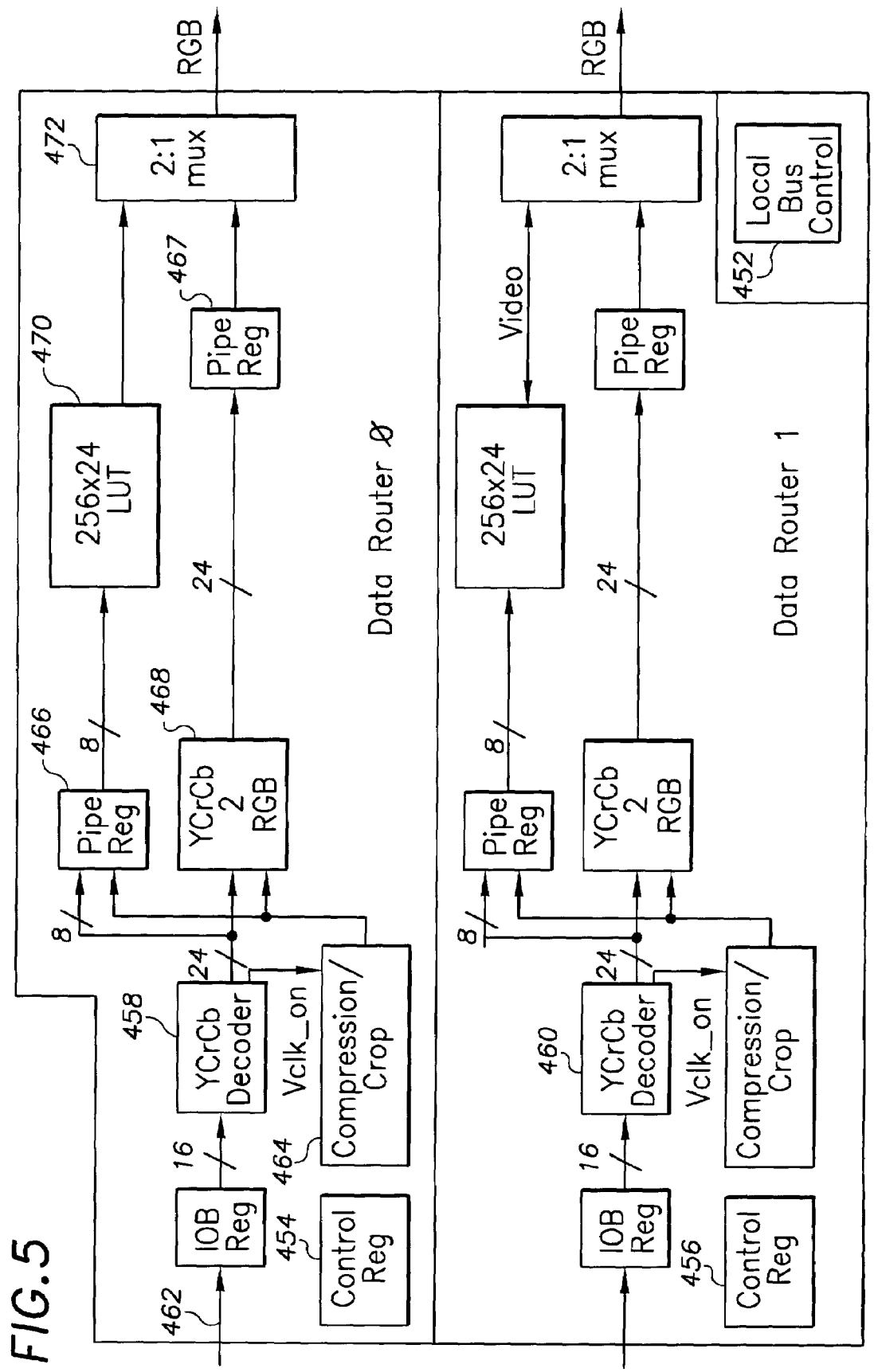
FIG. 5 is a functional block diagram of a pair of data routers.

FIG. 5 is a functional block diagram of a pair of data routers in accordance with one embodiment of the invention. As specified above, the example embodiment has four data routers in each terminal controller. Each data router is connected to one of the data output ports and clock output ports of multiplexer 272. In general, each data router decodes the YCrCb video data, selectively compresses the data, and converts the YCrCb video data to RGB data. The data routers also support multiple modes of operation. In one mode, each data router operates independent of the other data routers in processing a stream of video data. In another mode, two of data routers operate in parallel to process higher bandwidth video streams. In additional modes of operation, the data routers are configurable to decode color or monochrome video data in accordance with the selected video source. Thus, the routers are configurable to process video data from either color or monochrome video sources.

In one embodiment, two data routers are implemented on a single FPGA, for example, data router 0 and data router 1. Depending on the system requirements and FPGA resources, the routers could be implemented on more or fewer FPGAs. Local bus control logic 452 provides the interface between local bus 257 and data routers 0 and 1. Each of routers 0 and 1 have respective control registers 454 and 456 which control decoders 458 and 460, along with the respective multiplexers.

Data router 0 receives data from VID bus multiplexer 272 as shown by line 462. The input data is temporarily stored in a register implemented in an input/output block (IOB) of the FPGA. The input data are in YCrCb format as described above. The decoding performed by decoder 458 is dependent on whether 16 bits represent single color, single monochrome, or dual monochrome data. The value in control register 454 is configurable by processor 212 to indicate the format of the data to be decoded.

Decoder 458 translates the input 16-bit YCrCb data (8 Y bits and 8 CrCb bits) into 24-bit YCrCb data (8 Y bits, 8 Cr bits, and 8 Cb bits). For color data, every pair of pixels has Cr data in the first pixel and Cb data in the second pixel. The Y data is different between the pixels. Thus, for every pixel pair, the color is the same (Cr and Cb the same for two pixels), and the Y data is different. The 16 bits of monochrome data input to decoder 458 consists of two 8-bit Y values, and each set of 24 bits output from decoder 458 for monochrome data one of the two 8-bit Y values. Successive 24-bit outputs toggle between the lower and upper 8-bit Y values in the input 16-bits.

Compression/crop logic 464 controls the manner in which images are cropped and/or compressed by providing control signals to pipeline register 466 and converter 468, which converts from YCrCb format to RGB format (8 R bits, 8 G bits, and 8 B bits) in accordance with application specific requirements. RGB data from converter 468 is stored in pipeline register 469. Logic 464 includes counters that are configurable by processor 212, for example, for counting the pixel position within a frame and signaling which pixels can be ignored. Margins are thereby controlled for the left, right, top, and bottom for the input video stream. For compression, logic 464 is configurable to discard every other pixel, every fourth pixel, etc. The signal provided to pipeline register 466 and to converter 468 indicates whether to process or ignore the current pixel.

The data path that leads to pipeline register 466 is used for monochrome data, but is not used for color data. Thus, the 8 bits for the Y value are routed to pipeline register 466, and then used to address look-up table (LUT) 470. The LUT is configured with 256 24-bit RGB values.

Figure 6:
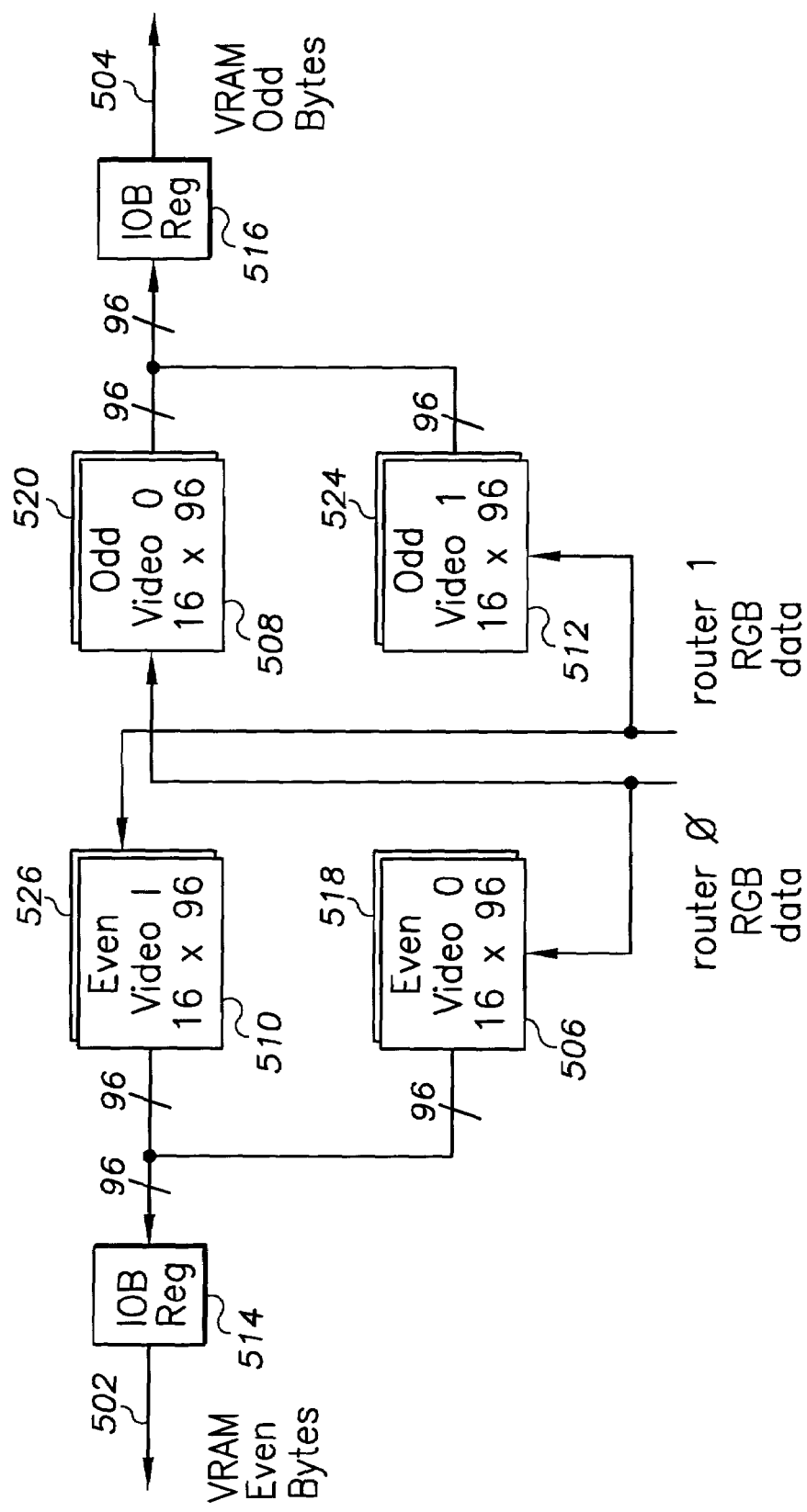
FIG. 6 is a functional block diagram of a FIFO arrangement.

Multiplexer 472 selects between the RGB translation of the monochrome data and the RGB translation of the color data, and the output data is transmitted to a FIFO arrangement (FIG. 6).

In conjunction with a FIFO arrangement, high frequency color data can be processed using two data routers in parallel. In one embodiment, odd numbered pixels are processed by data router 0, and even numbered pixels are processed by data router 2.

FIG. 6 is a functional block diagram of a FIFO arrangement in accordance with an example embodiment of the invention. The FIFO arrangement routes data for two data routers in the example embodiment, with the output data being time multiplexed between input data from the two routers. The even bytes are output to VRAM 228 on line 502, and the odd bytes are output to VRAM 228 on line 504.

The FIFO arrangement is operable in two modes. In the first mode, the video data is provided from two sources, and in the second mode, the video data is provided from a single high-frequency source. In the first most, for example, even pixels from data router 0 are accumulated in storage element 506, and the odd pixels from the data router are accumulated in storage element 508. Each of storage elements 506, 508, 510, and 512 have 96 entries of 16 bits (4×24-bit pixels). When storage elements 506 and 508 are full, the data stored therein is output to registers 514 and 516, respectively, and then in parallel to video RAM 228. Input data are stored to storage elements 518 and 520 while storage elements 506 and 508 are providing output. Once storage elements 518 and 520 are full, the contents thereof are output, and new data are stored to storage elements 506 and 508.

To accommodate video data from a high frequency source, the data are received on two channels, for example, from data router 0 and from data router 1. The even bytes are provided by router 0, and the odd bytes are provided by router 1. Storage elements 506 and 518 are used for the even bytes, and storage elements 512 and 524 are used for the odd bytes. Note that storage elements 508, 510, 520, and 526 are unused in the high-frequency mode.

The logic of the FIFO arrangement is implemented in an FPGA in an example embodiment. While, not shown, it will be appreciated that control logic is also included to control storage to and output from the storage elements, as well as controlling operation in the two operating modes. Memory controller 310 is coupled to the FIFO arrangements for sequencing the data to video RAM 228.

Figure 7:
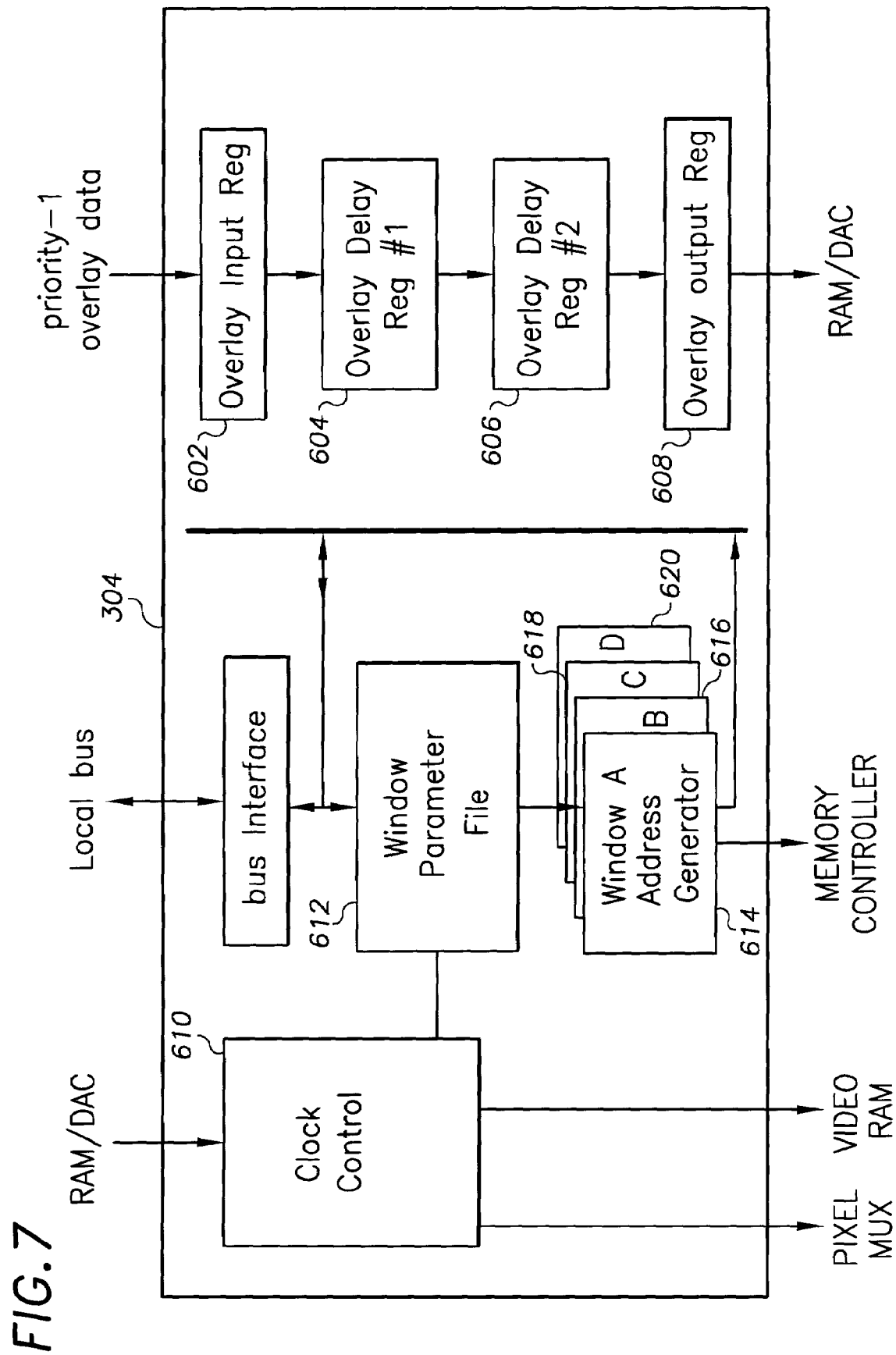
FIG. 7 is a functional block diagram of pixel output controller.

FIG. 7 is a functional block diagram of pixel output controller 304 in accordance with one embodiment of the invention. The pixel output controller is implemented in an FPGA and synchronizes the priority-1 overlay data with the video data and priority-2 overlay data, maintains window configuration parameters for the video display terminal, and clocks the pixel multiplexer 302 and video RAM 228.

The delay path for the priority-1 overlay data includes delay registers 602, 604, 606, and 608, each of which is 32 bits wide. The registers are clocked by clock control logic 610, which receives a synchronization signal from RAM/DAC 230. Clock control logic 610 also provides synchronization signals to pixel multiplexer 302 and memory video RAM 228.

The video data from the multiple sources is arranged in windows (not shown) on the display terminal in accordance with one embodiment. The configuration of these windows is controlled by parameters (e.g., size and layout) set forth in the window parameter file 612. Configuration of the window parameters is accomplished via local bus 257 and PCI interface 244.

The window parameters are provided to window address generators 614, 616, 618, and 620. Each of the window address generators translates a pixel address of the display terminal to an address into video RAM 228 responsive to the window parameters so that the proper video data is read from the video RAM for display at the selected position. The addresses are input to the memory controller 310, which in turn addresses the video RAM 228.

The present invention is believed to be applicable to a variety of applications involving distribution of video signals. Other aspects and embodiments of the present invention beyond those specifically described herein will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit arrangement for providing a video signal to a video display from a selectable subset of a plurality of digital video data carried on a plurality of video data channels, wherein the digital video data is generated from video signals from a plurality of video sources, and each video channel selectably carries either color or monochrome video data, comprising:
   a processor configured and arranged to interpret display commands;
   a selector circuit coupled to the processor and having a plurality of output ports and input ports arranged for connection to the plurality of video data channels, the selector circuit configured and arranged to select digital video data received at a first data rate from a subset of the channels responsive to an input selection signal from the processor and provide selected digital video data at the output ports at a second data rate that is half the first data rate;
   a plurality of data routers, each having an output port and an input port coupled to a respective one of the output ports of the selector circuit, and each data router configured and arranged to convert input video data from YCrCb format to RGB format; wherein the video data is logically segmented into frames of pixel data, and the data routers are configurable for operation in a first mode or a second mode, wherein a single data router processes video data from a single channel of video data while operating in the first mode, and in the second mode a first data router processes a first half of the pixel data of a frame and a second data router processes a second half of the pixel data of the frame;
   a video data sequencer coupled to the output ports of the data routers, the sequencer configured and arranged to merge the selected video data into frames of video data; and
   a digital-to-analog converter coupled to the video data sequencer, the converter configured and arranged to generate an analog video signal from the frames of video data.

2. The apparatus of claim 1, wherein each data router is configurable to compress the input video data at selectable compression level.

3. The circuit arrangement of claim 1, wherein the circuit arrangement is supported on a circuit board having connectors arranged for connecting to the video channels.

4. The circuit arrangement of claim 1, further comprising:
a first memory coupled to the processor and arranged for storage of graphics data to be overlaid on the video data;
a second memory coupled to the sequencer and arranged for storage of the video data; and
a pixel selector having input ports coupled to the first memory and to the second memory and an output port coupled to the digital-to-analog converter, wherein the pixel selector is configured and arranged to select graphics data from the first memory when graphics data is present.

5. The circuit arrangement of claim 4, further comprising:
a third memory coupled to the processor and arranged for storage of a first-level priority graphics data;
a pixel output controller coupled to the third memory and to the video memory, the pixel output controller configured and arranged to sequence output of data from the first and second memories to the pixel selector and sequence first-level priority graphics data from the third memory to the digital-to-analog converter, wherein the first-level priority graphics data which takes precedence for display over the graphics data of the first memory and over the video data.

6. The circuit arrangement of claim 4, wherein the pixel output controller is further configured and arranged to sequence output of video data from the second memory responsive to window position parameters associated with data from the video sources.

7. The circuit arrangement of claim 4, further comprising a blink-translation circuit coupled to the first memory and to the pixel selector, wherein the blink-translation circuit is configured and arranged to selectively replace an input pixel value with a configurable pixel value at a configurable interval, alternate between the input pixel value and the configurable pixel value at the configurable interval, and cause selected graphics data to flash on a video display terminal.

8. The circuit arrangement of claim 4, wherein each data router is configurable to compress the input video data at selectable compression level.

9. A method for providing a video signal to a video display from a selectable subset of a plurality of digital video data carried on a plurality of video data channels, wherein the digital video data is generated from video signals from a plurality of video sources, and each video channel selectably carries either color or monochrome video data, comprising:
interpreting display commands that select a subset of the video data;
receiving digital video data on the plurality video data channels at a first data rate;
selecting digital video data from a subset of the channels responsive to the display commands and providing as output selected digital video data at the output ports at a second data rate that is half the first data rate;
decoding color and monochrome format video data responsive to configuration signals indicating data formats for the channels;
converting the video data from YCrCb format to RGB format, wherein the video data is logically segmented into frames of pixel data, and the converting includes converting the video data from YCrCb format to RGB format using a single converter for each frame in response to a first operating mode, and converting the frame of video data from YCrCb format to RGB format using a first converter for a first half of the pixel data of the frame and a second converter for a second half of the pixel data of the frame in response to a second operating mode;
merging the selected video data into frames of video data; and
converting the video data to an analog video signal from the frames of video data.

10. The method of claim 9, further comprising compressing the video data at a selectable compression level responsive to the display commands.

11. The method of claim 10, further comprising:
storing the video data in a first memory;
storing overlay data in a second memory, wherein the overlay data; and
selecting between the overlay data and the video data for conversion to a video signal.

12. The method of claim 9, further comprising:
storing the video data in a first memory;
storing overlay data in a second memory, wherein the overlay data; and
selecting between the overlay data and the video data for conversion to a video signal.

13. The method of claim 9, further comprising:
establishing respective priority levels for the digital video data generated from video signals from the video sources; and
if a portion of the selected video data from a first one of the subset of channels and a portion of the selected video data from a second one of the subset of channels require common storage space in the first memory, then selecting between the portion of the video data from the first channel and the portion of the video data from the second channel responsive to the priority levels.

14. An apparatus for providing a video signal to a video display from a selectable subset of a plurality of digital video data carried on a plurality of video data channels, wherein the digital video data is generated from video signals from a plurality of video sources, and each video channel selectably carries either color or monochrome video data, comprising:
means for interpreting display commands that select a subset of the video data;
means for selecting digital video data from a subset of the channels responsive to the display commands, whereby selected digital video data is provided at the output ports;
means for decoding color and monochrome format video data responsive to configuration signals indicating data formats for the channels;
first and second means for converting the video data from YCrCb format to RGB format, wherein the video data is logically segmented into frames of pixel data, and the first means for converting the video data from YCrCb format to RGB format converts all pixel data of a frame responsive to a first operating mode, and responsive to a second operating mode the first converter converts a first half of the pixel data of the frame and the second converter converts the pixel data of a second half of the frame;
means for merging the selected video data into frames of video data; and
means for converting the video data to an analog video signal from the frames of video data.

* * * * *